Oct. 3, 1939.　　　　E. LATOCHA　　　　2,174,828
REEL FOR CLOTHESLINES AND THE LIKE
Filed Jan. 29, 1937

INVENTOR.
Eugene Latocha
BY Louis Chayka ATTORNEY.

Patented Oct. 3, 1939

2,174,828

UNITED STATES PATENT OFFICE 2,174,828

REEL FOR CLOTHESLINES AND THE LIKE

Eugene Latocha, Cleveland, Ohio

Application January 29, 1937, Serial No. 122,906

1 Claim. (Cl. 242—151)

The purpose of my invention is to provide a reel which will securely hold the line thereon and which will prevent said line from being unrolled from the reel under its own weight. Specifically, my purpose is to provide a means which will make it possible to frictionally control the movement of said line in or out. The need of such a device has, I believe, been long felt. When ordinary reels, having no such a checking device were used, it would happen quite often that the clothesline attached at one end to a stationary object would, under its own weight, unreel itself, fall to the ground and get soiled. Such an accident is prevented when the reel of my construction is used.

I attain my object by the mechanism illustrated in the accompanying drawing, in which.

Similar numerals refer to similar parts throughout the several views.

Figure 1:
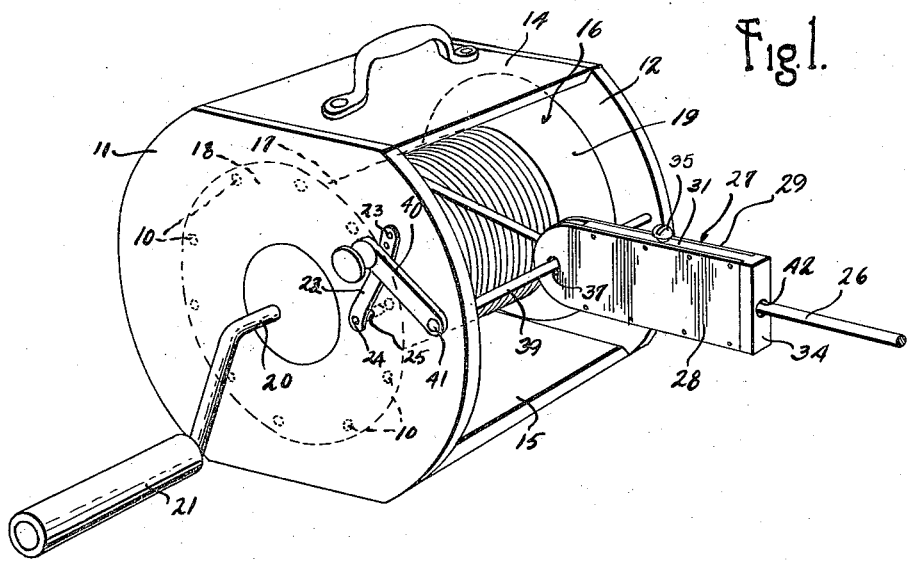
Fig. 1 shows a perspective view of my reel provided with the checking frictional device.

The heel is in a conventional form and comprises a suitable housing and a rotatable spool inside thereof. The housing consists of two side flanges 11 and 12 and the enveloping wall extending between said flanges and forming a flattened top 14, a flattened bottom 15 and a curved rear wall extending between said top 14 and bottom 15. The front of the housing is open in order to admit the clothesline into or out of the reel. A spool 16, comprising a cylindrical body 17 and flanges 18 and 19, is rotatably mounted within the said housing in such a manner that the flanges of the housing and the flanges of the spool are coaxially aligned. The spool is actuated by a crank 20, provided with a handle 21. One of the spool flanges 18 is provided with a series of perforations 10, marginally located on the rim of said flange. The outside flange 11 of the housing, abutting said inside flange 18, carries a spring member 22 secured at 23 to the outside flange 11 and provided with a pin 24. Said pin 24 is adapted to be depressed through an opening 25 in the flange 11 so that when so depressed it projects into one of the perforations on the flange 18, thus stopping the rotary movement of the spool 16. 26 indicates the clothesline normally wound upon said spool. In being drawn out from the reel, said clothesline 26 passes through, what I call, the feeder 27.

Figure 2:
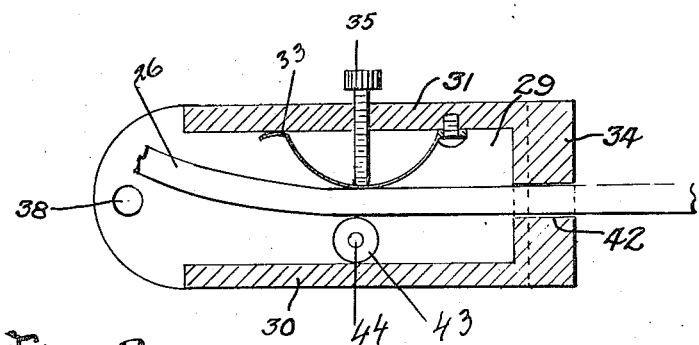
Fig. 2 shows a longitudinal sectional view of the same.

The construction of said feeder is shown in Fig. 2. It is a device oblong in shape, box-like in structure and may be made of wood or metal. It comprises two parallel walls 28 and 29, oblong in shape and spaced apart by two narrow side members 30 and 31, disposed in parallel, and a member 34 connecting the ends of the two members 30 and 31 disposed at right angle thereto, and closing one end of said feeder. The opposite side thereof is left open. A passage for the line in said member 34 is marked 42. The feeder embodies a friction spring 33 anchored at one end to the member 31 and directly beneath the spring 33 there is provided a roller 43 suitably mounted on a pin 44 fixed in the walls 28 and 29. The clothesline 26 is passed between the roller and spring member 33, as clearly shown in Fig. 2. A thumb screw 35 is threadedly engaged through the member 31, the inner end bearing upon the spring 33 directly over the roller 43. By this arrangement most of the friction needed to contact the line is supplied by the spring 33, the roller providing but a minor portion thereof. The frictional contact of the spring 33 may be varied through adjustment of the thumb screw 35. Obviously, the roller 43 may be supplanted by a stationary post or block, the spring 33 cooperating therewith in a similar manner. At one end of said feeder, the walls 28 and 29 thereof are provided with eyelets 37 and 38, respectively, in order that the feeder may be mounted slidably on rod 39, extending between flanges 11 and 12 of the housing of the reel.

Normally, the clothesline is coiled on spool 16, as shown in Fig. 1. The free end of the line passes through the feeder and is frictionally engaged by the spring 33. In operating the reel, the person handling it may attach the free end of the clothesline to a post, or to some other stationary object, and then receding from said post and holding the reel may allow the clothesline to unroll itself from said reel. The unrolled line passes through the feeder and is frictionally engaged by the spring 33. This frictional engagement is sufficient to stop the unrolling of the line under the weight of that portion of the line that had already been unwound from the reel, but is not sufficient to stop the line from being unrolled under the direct pull exerted by the person holding the reel and receding with it from the point to which the free end of the line is attached. Ordinarily, without the aid of this feeder, the clothesline already paid out would, by its own weight, tend to unroll the remaining line on the spool and very likely fall to the ground, unless in some way checked manually by the person operating said reel. When it is necessary to wind the line back upon the reel, the person using said reel may do so with the aid of the crank 20 actuating the spool 16. The line, being withdrawn into the reel, passes again through said feeder, and should the person operating said crank remove his or her hand from said crank, the line would not be allowed to fall to the ground, since it would be restrained by its frictional engagement with the spring in said feeder.

An additional device to check the movement of the line is provided in the device on the outside flange 11 of the housing. In this instance the spring member 23 may be actuated by the superimposed lever 40 pivoted at 41, in order that the pin 24 may enter into one of the perforations 10 on the apertured flange 18 and thus stop the rotation of the spool 16. When the lever is shifted back to its normal position, as shown in Fig. 1, spring 23 automatically withdraws the pin 24 from the aperture in the flange and the spool is free to be rotated by the person operating it.

I realize that the novelty of my invention lies only in the construction of my said checking device called the feeder and in the combination of said checking device with the conventional reel. Other changes are possible without departing from the spirit of my invention.

What I claim is:

A device to control the movement of the line from a reel, operatively in conjunction therewith and comprising a separate housing, a semi-elliptic spring member engaging said line from one side and a roller engaging said line from the other side, said spring member being curved so as to present increasingly frictional surface against the line passing in either direction, and screw means bearing against the face of the leaf spring at the point opposite to that in contact with the line to adjust the amount of friction.

EUGENE LATOCHA.